United States Patent Office 3,391,001
Patented July 2, 1968

3,391,001
PRODUCTION OF FLAVORFUL PROTEIN HYDROLYSATE
Louis Sair, Evergreen Park, Ill., assignor to The Griffith Laboratories, Inc., Chicago, Ill., a corporation of Illinois
No Drawing. Filed Feb. 26, 1965, Ser. No. 435,718
6 Claims. (Cl. 99—17)

ABSTRACT OF THE DISCLOSURE

Edible protein, such as soy protein and wheat gluten, is hydrolyzed in aqueous hydrochloric acid until the alpha amino nitrogen content is in the range from 35% to 58% of the total nitrogen content, and then a sodium alkali, such as sodium hydroxide, is added to a pH of 4.5 to 7.

---

The present invention relates to the hydrolysis of proteins. Proteins are various molecular combinations of molecular structures containing various amino acids. The differences in taste and other properties of the hydrolysates are due to the differences not only in the combination but also in the amino acids of the combinations.

Protein hydrolysates have long been used for taste or flavor. The taste or flavor depends upon the combination of break-down products from the original protein. For example, glutamic acid is one of the amino acids, which are the end products of a complete hydrolysis. Separated from other products and neutralized with sodium alkali, glutamic acid forms monosodium glutamate. This is a well-known taste accentuator, more than it is a flavor. It makes the taste buds more sensitive, and thereby enhances the tastes of other foods.

Heretofore, proteins such as casein, lactalbumen, rice gluten, corn gluten, wheat gluten, peanut protein, soy protein, yeast, whale meat, and other meats have been subjected to hydrolysis with acid to reduce the protein to its amino acid constituents. Upon completion of hydrolysis the insoluble humin factor is separated either by filtration or centrifugation before or after neutralization. The neutralized hydrolysate liquor may then be used directly for the manufacture of liquid hydrolysates, paste hydrolysates, or tray dried or spray dried products. The hydrolysate liquor may be decolorized as desired with a color adsorbent which is then filtered from the decolorized liquid.

In neutralization, the hydrolysate is treated with alkali to achieve a pH in the range from 4.5 to 7, for example, pH of 6.5. Acids such as hydrochloric, sulfuric and phosphoric, may be used to liberate the amino acids. To avoid separating the amino acids from the mineral acid used in hydrolysis, it has been a general practice to use hydrochloric acid, so that on neutralization with sodium alkali, sodium chloride results, which can be retained with the amino acid salts.

The amino acid constituents are joined in the proteins as longer-chain peptides and polypeptides. These longer-chain groups are variously joined in larger protein molecules. Hydrolysis initially breaks the linkages releasing various combinations of water-soluble proteins, peptides, polypeptides and alpha amino acids, and finally reduces the peptides and polypeptides to their amino acid constituents.

It is the general object of the invention to subject protein to acid hydrolysis to a limited extent to effect a partial hydrolysate with superior flavor.

This object of the invention is achieved by effecting a controlled hydrolysis of protein with mineral acid, in order to limit the content of amino acids to a predetermined extent in the presence of molecular combinations of amino acids which are hydrolyzable hydrolytic products of the original protein.

It is, therefore, a particular object of the invention to produce a protein hydrolysate in which 35% to 58% of the nitrogen content is alpha amino acid nitrogen.

In other words, protein is subjected to hydrolysis with hydrolyzing acid in any conventional procedure, but without completing the hydrolysis. The end point can be ascertained by calibrating a fixed procedure using predetermined amounts of water, selected acid, and selected protein. In one procedure a conventional amount of selected acid may be used which is suitable for completing a hydrolysis, and the hydrolytic action then arrested at the time determined by the calibration, when a value in said predetermined range is attained.

The second method is a modification using a predetermined lesser amount of the acid and likewise to arrest the hydrolysis at the time determined by calibrating the procedure with that amount, when a value in said range is attained. This method is preferred when hydrochloric acid is used and when it is neutralized to sodium chloride and the hydrolytic products are neutralized to a pH in the range from 4.5 to 7. Sodium chloride in the neutralized product is thus minimized.

Commercial proteins vary in content of protein from about 60% to 100%. Upon complete hydrolysis the alpha amino nitrogen varies in the range from 63.5% to 67% of the total nitrogen of the 100% protein.

The control is established by numerous experiments in which the range of N-ratios is selected by judgment as to flavor.

A fixed procedure has been employed for such calibration in which the protein in a given volume of aqueous solution containing hydrolyzing acid is refluxed for 11 hours, neutralizing with caustic soda to pH of 5.5, and spray-drying the neutralized hydrolysate. By varying the acid content, the extent of hydrolysis is determined by determining the said N-ratio in the dried hydrolysate.

Table I shows a mixture of two commercial proteins so processed with varying amounts of hydrochloric acid (Sp. gr. 1.1888 which is 37% HCl by weight) and varying amounts of water. Test 1 is designated as 100%, representing the amount of acid needed for the fixed procedure to produce the ultimate content of alpha amino acids where the N-ratio is 67%.

TABLE I

| | Test | | | |
|---|---|---|---|---|
| | 1 | 2 | 3 | 5 |
| | Percent Acid Used | | | |
| | 100 | 80 | 60 | 40 |
| Soy protein (70% protein) in gms | 99.6 | 99.6 | 99.6 | 99.6 |
| Wheat gluten (85% protein) in gms | 140.0 | 140.0 | 140.0 | 140.0 |
| Said hydrochloric acid in ml | 250 | 200 | 150 | 100 |
| Water in ml | 180 | 230 | 280 | 330 |
| Parts by weight of said acid (37%) per 100 parts of 100% protein | 166 | 132 | 99 | 66 |
| Percent total N in spray-dried hydrolysate | 6.89 | 7.04 | 7.27 | 7.81 |
| Percent Alpha amino acid N | 4.61 | 4.46 | 4.20 | 2.80 |
| Percent Amino-N to total N | 67.0 | 63.5 | 57.7 | 35.8 |

Table I shows that as the amount of acid is reduced the free amino acids are reduced.

Table II shows the percent hydrolysis of Tests 1 to 5, repeating certain data of Table I, and shows also the analytical amount of monosodium glutamate (MSG) in the hydrolysate.

TABLE II

| Test | Percent Acid Used | Percent Amino-N to total-N | Percent Hydrolysis | Percent MSG |
|---|---|---|---|---|
| 1 | 100 | 67 | 100 | 14.1 |
| 2 | 80 | 63.5 | 95 | 15.1 |
| 3 | 60 | 57.7 | 86 | 14.9 |
| 4 | 50 | 44.1 | 66 | 9.0 |
| 5 | 40 | 35.8 | 53.5 | 1.5 |

The flavor of the hydrolysates is herein tagged F. Table III shows the character of F for the tests of Table II.

TABLE III

| Test | Percent Acid Used | Flavor F |
|---|---|---|
| 1 | 100 | Similar to a conventional complete hydrolysis. |
| 2 | 80 | Do. |
| 3 | 60 | Strong beefy flavor. |
| 4 | 50 | Most desirable.* |
| 5 | 40 | Slight bitterness evident. |

*Found by flavor experts to be best flavor for certain commercial products.

Table II shows that in use of 50% of acid (Test 4), all of the potential MSG has not been liberated, the hydrolysate containing larger molecular bodies comprising glutamic acid components, as a mixture of peptides, and polypeptides and possibly some solubilized protein bodies. By lowering the acid to 40% only 1.5% of MSG is produced.

Table IV shows in column 1 a number of commercial proteins, used in different amounts to supply 100 parts by weight of 100% protein. Column 2 shows the parts by weight of said 37% hydrochloric acid, which corresponds to the said 50% of acid used in the foregoing tables. Column 3 shows the percent of alpha-amino nitrogen to total nitrogen in the hydrolysate. Column 4 shows the said N-ratio when twice as much acid is used to effect a complete hydrolysis.

TABLE IV

| 1 | 2 | 3 | 4 |
|---|---|---|---|
| Protein | Parts of Said Acid | Percent Amino-N to total-N | Maximum Amino-N to total-N |
| Yeast | 83 | 46.5 | 65.9 |
| Casein | 83 | 51.1 | 73.5 |
| Wheat | 83 | 44.5 | 68.6 |
| Rice | 83 | 51.4 | 69.3 |
| Soy | 83 | 47.2 | 65.5 |

Table V is an extension of Table IV showing the analysis of complete and partial hydrolysates thereof, in terms of MSG. Column 1 shows the protein. Column 2 shows the MSG in the partial hydrolysate. Column 3 shows the MSG in the complete hydrolysate. Column 4 shows the percent of available MSG liberated in the partial hydrolysate.

TABLE V

| 1 | 2 | 3 | 4 |
|---|---|---|---|
| Protein | Percent MSG in Hydrolysate (Partial) | Percent MSG in Hydrolysate (Complete) | Percent available MSG Liberated in Col. 2 |
| Yeast | 2.8 | 6.5 | 43.2 |
| Casein | 10.9 | 12.8 | 85.0 |
| Wheat | 11.5 | 17.0 | 67.5 |
| Rice | 8.3 | 9.0 | 92.2 |
| Soy | 4.5 | 8.6 | 52.2 |

Table VI gives the formulation used for the results of Tables IV and V. Columns 1 and 2 give the actual weight in grams of the commercial protein. Column 3 gives the percent content of protein. Column 4 gives the ml. of 37% hydrochloric acid used. Column 5 gives the ml. of water used. Column 6 gives the hours of reflux for hydrolysis.

TABLE VI

| 1 | 2 | 3 | 4 | 5 | 6 |
|---|---|---|---|---|---|
| Commercial Protein | Gms. used | Percent Content of 100% protein | Ml. acid | Ml. water | Hours reflux |
| Casein | 204 | 89 | 125 | 305 | 11 |
| Wheat gluten | 224 | 80 | 125 | 305 | 11 |
| Rice gluten | 231 | 77.9 | 125 | 305 | 11 |
| Soy protein | 196 | 91 | 125 | 305 | 11 |

The invention, as explained above, employs a fixed procedure for comparative results, namely, constant liquid volume, and 11-hours reflux time. It is known that conventional hydrolysis may be effected in less time at superatmospheric pressures, and with less acid at superatmospheric pressures. For the present invention, the amounts of protein, acid and water, may be varied by varying the time, or the temperature, or both. The critical range is determined by adopting a fixed procedure and calibrating it to determine the conditions which produce a hydrolystate, in which the percent of alpha amino nitrogen is in the range from 35% to 58% of the total nitrogen.

Accordingly, the invention is not limited to or by the procedures given by way of illustration, and modifications are contemplated as falling within the scope of the appended claims.

I claim:

1. In the process consisting of incompletely hydrolyzing edible protein in an aqueous solution of hydrochloric acid, and neutralizing said acid in the reaction mass with a sodium alkali capable of forming sodium chloride, the improvement consisting of neutralizing the incompletely hydrolyzed mass to a pH in the range from 4.5 to 7 when the alpha amino nitrogen content thereof is in the range from 35% to 58% of the total nitrogen content, and drying the so-neutralized reaction mass.

2. The process of claim 1 in which the protein is selected from the group consisting of casein, lactalbumen, soy protein, yeast, meat and mixtures thereof.

3. A product consisting of the dry product of an incomplete hydrochloric-acid hydrolysis of edible protein characterized analytically by a content of alpha amino nitrogen in the range from 35% to 58% of the total nitrogen, by a pH in the range from 4.5 to 7.0, and by a content of sodium chloride.

4. A product consisting of the dry product of an incomplete hydrochloric-acid hydrolysis of vegetable protein characterized analytically by a content of alpha amino nitrogen in the range from 35% to 58% of the total nitrogen, by a pH in the range from 4.5 to 7.0, and by a content of sodium chloride.

5. In the process consisting of incompletely hydrolyzing edible protein in an aqueous solution of hydrochloric acid, and neutralizing said acid in the reaction mass with a sodium alkali capable of forming sodium chloride, the improvement consisting of neutralizing the incompletely hydrolyzed mass to a pH in the range from 4.5 to 7 when the alpha amino nitrogen content thereof is in the range from 35% to 58% of the total nitrogen content.

6. A product whose solid contents consist of the product of a sodium neutralized incomplete hydrochloric-acid hydrolysis of edible protein characterized analytically by a content of alpha amino nitrogen in the range from 35% to 58% of the total nitrogen, by a pH in the range from 4.5 to 7.0, and by a content of sodium chloride.

References Cited

UNITED STATES PATENTS 2,832,717 4/1958 Ferguson _____ 260—112
2,991,309 7/1961 Hoglen et al. _____ 260—529

FOREIGN PATENTS 846,682 8/1960 Great Britain.

WILLIAM H. SHORT, *Primary Examiner.*

E. M. WOODBERRY, *Assistant Examiner.*